United States Patent [19]

VanGinhoven

[11] Patent Number: 4,930,944
[45] Date of Patent: Jun. 5, 1990

[54] BLOWER WITH ENERGY ABSORBING HOUSING

[75] Inventor: Robert M. VanGinhoven, Lancaster, Pa.

[73] Assignee: Ford New Holland, Inc., New Holland, Pa.

[21] Appl. No.: 300,513

[22] Filed: Jan. 23, 1989

[51] Int. Cl.⁵ .......................................... A01D 87/10
[52] U.S. Cl. ...................................... 406/97; 406/96; 406/103; 415/203; 415/206; 415/126
[58] Field of Search ...................... 406/96, 97, 99, 100, 406/103, 105; 37/244; 415/203, 206, 126, 128, 9, 174.2, 173.3; 171/17

[56] References Cited

U.S. PATENT DOCUMENTS

| | | | |
|---|---|---|---|
| 640,345 | 1/1900 | Wilberforce | 415/206 |
| 1,609,545 | 12/1926 | Hauf | 415/203 |
| 3,314,596 | 4/1967 | Burinsky et al. | |
| 4,235,293 | 11/1980 | Ellis | 171/17 |
| 4,595,318 | 6/1986 | Viesselmann | 406/97 |

Primary Examiner—Sherman D. Basinger
Assistant Examiner—Christopher P. Ellis
Attorney, Agent, or Firm—Darrell F. Marquette; Frank A. Seemar; Larry W. Miller

[57] ABSTRACT

A blower for conveying material includes a housing and a spout. The housing has a front wall, a rear wall and an arcuate side wall extending between the front and rear walls. A plurality of arms with paddles mounted thereon are rotatable within the housing to discharge material through the spout. Springs are provided to urge a portion of the housing side wall into a normal position while permitting this side wall portion to be flexed outwardly if a foreign object such as a rock impacts against the inside of the housing side wall with enough force to overcome the springs. Permanent deformation to the housing is thus prevented by the springs.

6 Claims, 1 Drawing Sheet

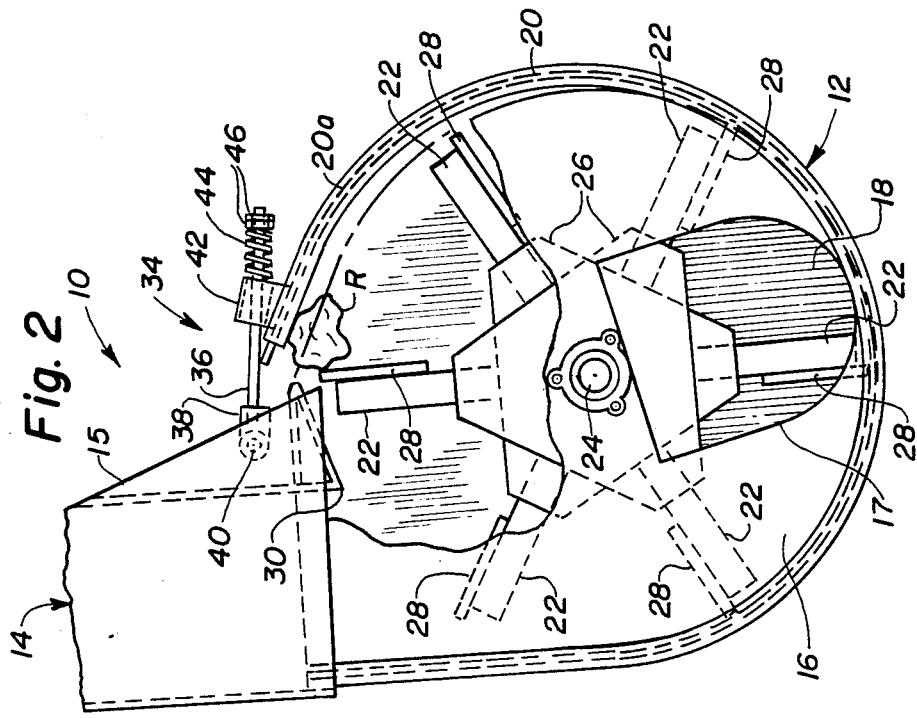
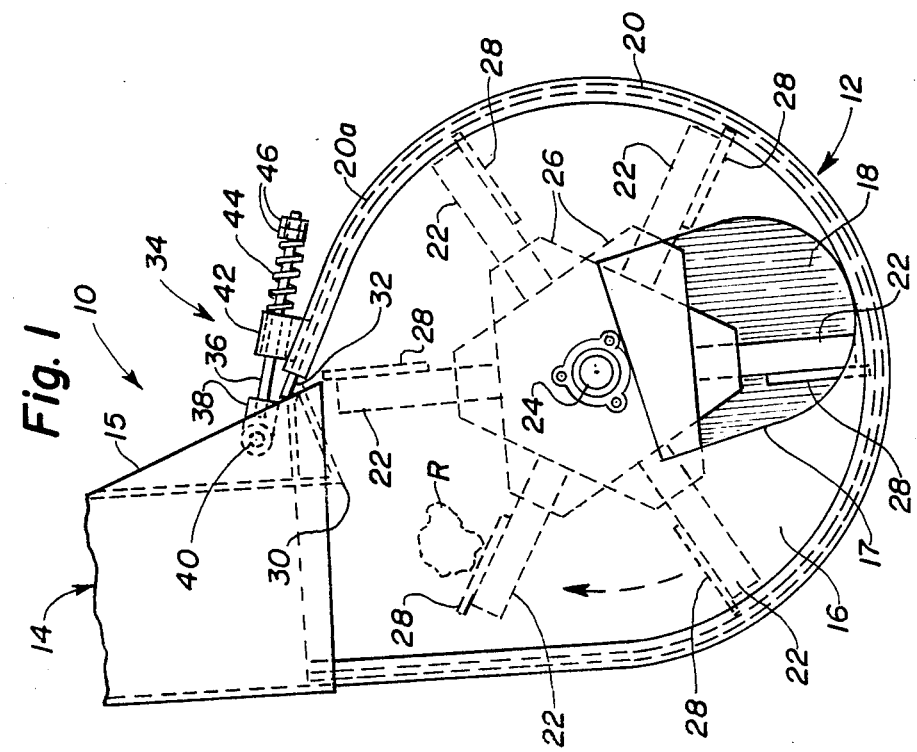

BLOWER WITH ENERGY ABSORBING HOUSING

BACKGROUND OF THE INVENTION

This invention relates generally to blowers for conveying material and, in particular, to such blowers used on leaf loading machines.

U.S. Pat. No. 4,771,504 granted Sept. 20, 1988 to R. M. VanGinhoven et al discloses a machine for loading leaves which includes a blower for discharging leaves through a spout. This blower is comprised of a plurality of arms extending radially from a shaft for rotation within a cylindrical housing formed of a front wall, a rear wall and an arcuate side wall extending between the front and rear walls. The arms carry blades or paddles disposed in close proximity to the inner surfaces of the housing walls. Leaves picked up from the ground by the machine are delivered to the blower by an auger via an opening in the housing front wall. The blades sweep the leaves around the inside of the housing and then out the spout which extends upwardly from the housing.

One problem encountered when operating the machine of the VanGinhoven et al patent is that foreign objects such as rocks and bottles are picked up with leaves and then conveyed into the blower. These foreign objects are thrown against the inside of the blower housing by the blades thereby causing damage usually in the form of permanent deformation to the housing. This damage typically occurs on the arcuate side wall of the housing immediately downstream from the spout and adjacent a part of the blower commonly referred to as the cut off knife.

U.S. Pat. Nos. 3,314,596 granted Apr. 18, 1967 to J. L. Burinsky et al and 4,595,318 granted June 17, 1986 to K. P. Viesselmann disclose blowers designed to convey forage material into silos. The blower in the Buriusky et al patent includes a cut off knife which is Z-shaped to prevent material from wedging in a corner of the blower housing adjacent the spout. The blower in the Viesselmann patent includes a replaceable wear liner on the inside of the housing. However, neither the Z-shaped knife of the Burinsky et al blower nor the wear liner of the Viesselmann blower overcome the above-mentioned problem encountered when operating the leaf loading machine of the VanGinhoven et al patent.

SUMMARY OF THE INVENTION

It is an object of the present invention to provide an energy or shock absorbing housing for a blower which prevents damage to the housing from foreign objects.

The present invention provides an improvement for use in a blower including a housing forward of a front wall, a rear wall and a side wall extending between the front and rear walls, a plurality of arms extending radially from a central shaft for rotation within the housing, and paddles mounted on the arms and disposed in close proximity to the inner surfaces of the front, rear and side walls. The improvement of the present invention comprises means urging a portion of the housing side wall into a normal position while permitting this side wall portion to be flexed outwardly if a foreign object impacts against the inside of the side wall portion with sufficient force to overcome the urging means. The blower also includes a spout mounted on the housing through which material is discharged, and the urging means is connected between the spout and the housing. In its preferred embodiment, the urging means comprises a rod pivotally connected to the spout and a spring disposed on the rod in a compressed state to urge the housing side wall portion into the normal position.

DESCRIPTION OF THE DRAWINGS

FIGS. 1 and 2 are side elevational views of a blower incorporating the preferred embodiment of the energy absorbing housing of the present invention.

DESCRIPTION OF THE PREFERRED EMBODIMENT

Referring to FIG. 1, a blower 10 includes a housing 12 and a spout 14. The housing 12 consists of a front wall 16, a rear wall 18, and an arcuate side wall 20 extending between the front and rear walls 16, 18. A plurality of arms 22 extend radially from a central shaft 24. Arms 22 are fastened between plates 26 which are fixed to rotate with the shaft 24. Paddles 28 are mounted on the arms 22 in close proximity to the inner surfaces of the housing walls 16, 18 and 20.

During operation of the blower 10, material is fed into the housing 12 via an opening 17 formed in the front wall 16 thereof while the paddles 28 are rotating in the direction indicated by the arrow in FIG. 1. The material is swept around the inside of the housing 12 by the paddles 28 and is then discharged through the spout 14. A cut off knife 30 is provided in the housing 12 to prevent the paddles 28 from wedging material into a corner 32 of the housing 12 which is immediately downstream from the spout 14 and adjacent the cut off knife 30. If foreign objects such as a rock R are fed into the housing 12 with the material, they are also swept by the paddles 28 until they are discharged through the spout 14. Occasionally, these foreign objects are flung outwardly with sufficient force to cause permanent deformation of the housing 12, particularly in the vicinity of the corner 32.

According to the present invention, energy or shock absorbing means 34 is provided on the blower 10 to prevent foreign objects from damaging the housing 12. Means 34 includes a pair of rods 36 connected to brackets 38 which are pivotally mounted on a cross shaft 40 which extends between flange members 15 of the spout 14. Rods 36 extend through brackets 42 mounted on the side wall 20 of housing 12. Springs 44 are positioned on the rods 36 and are compressed between brackets 42 and nuts 46 which are threaded onto the ends of the rods 36. An upper portion 20a of the housing side wall 20 adjacent the corner 32 is urged into the normal position shown in FIG. 1 by the springs 44 but it may be flexed outwardly as shown in FIG. 2 if a foreign object such as rock R is flung against the side wall 20 with enough force to overcome the combined forces of the springs 44. The upper portion 20a of the side wall 20 will also be flexed outwardly if a foreign object becomes wedged between one of the paddles 28 and the side wall 20.

It will be understood that springs 44 absorb the impact of foreign objects on the housing side wall 20 while urging the upper portion 20a of the side wall 20 into the normal position shown in FIG. 1. This effectively prevents damage to the housing 12 when handling foreign objects such as rocks.

What is claimed is:

1. In a blower for conveying material including a housing formed of a front wall, a rear wall, and a side wall extending between said front and rear walls, a plurality of arms extending radially from a central shaft for rotation within said housing, paddles mounted on said arms and disposed in close proximity to the inner surfaces of said front, rear and side walls, the improvement comprising:

means urging a portion of said side wall into a normal position but permitting said side wall portion to be flexed outwardly if a foreign object impacts against the inside of said side wall portion with sufficient force to overcome said urging means.

2. The improvement of claim 1, wherein said blower includes a spout mounted on said housing through which material is discharged, said urging means being connected between said spout and said housing.

3. The improvement of claim 2 wherein said urging means comprises a rod pivotally connected to said spout, a spring disposed on said rod in a compressed state to urge said side wall portion of said housing into said normal position.

4. The improvement of claim 3, wherein said spring is further compressed when said side wall portion is flexed outwardly.

5. The improvement of claim 2, wherein said blower also includes a cut off knife disposed in said housing to prevent said paddles from wedging material into a corner of said housing immediately downstream from said spout and adjacent said cut off knife.

6. The improvement of claim 5, wherein said side wall portion is adjacent said corner.

* * * * *